United States Patent
Ooga et al.

(10) Patent No.: US 9,612,143 B2
(45) Date of Patent: Apr. 4, 2017

(54) MANUFACTURING METHOD FOR RESIN HOLLOW MEMBER AND AIRFLOW MEASURING DEVICE HAVING THE RESIN HOLLOW MEMBER

(71) Applicant: DENSO CORPORATION, Kariya, Aichi-pref. (JP)

(72) Inventors: Takashi Ooga, Kariya (JP); Akiyuki Sudou, Takahama (JP)

(73) Assignee: DENSO CORPORATION, Kariya (JP)

( * ) Notice: Subject to any disclaimer, the term of this patent is extended or adjusted under 35 U.S.C. 154(b) by 264 days.

(21) Appl. No.: 14/340,996

(22) Filed: Jul. 25, 2014

(65) Prior Publication Data
US 2015/0096365 A1 Apr. 9, 2015

(30) Foreign Application Priority Data
Oct. 4, 2013 (JP) ................. 2013-208977

(51) Int. Cl.
| | |
|---|---|
| G01F 1/684 | (2006.01) |
| G01F 5/00 | (2006.01) |
| B29C 65/42 | (2006.01) |
| B29C 65/54 | (2006.01) |
| B29L 31/34 | (2006.01) |
| B29C 65/78 | (2006.01) |
| B29C 65/00 | (2006.01) |

(52) U.S. Cl.
CPC ............ *G01F 1/684* (2013.01); *B29C 65/42* (2013.01); *B29C 65/54* (2013.01); *B29C 66/12461* (2013.01); *B29C 66/12463* (2013.01); *B29C 66/244* (2013.01); *B29C 66/54* (2013.01); *G01F 1/6842* (2013.01); *G01F 5/00* (2013.01); *B29C 65/7814* (2013.01); *B29C 66/12445* (2013.01); *B29C 66/30321* (2013.01); *B29L 2031/3481* (2013.01); *Y10T 428/139* (2015.01)

(58) Field of Classification Search
CPC ...... B29C 65/42; B29C 66/30321; G01F 5/00
USPC ........................ 156/182; 264/261; 73/204.11
See application file for complete search history.

(56) References Cited

FOREIGN PATENT DOCUMENTS

| | | |
|---|---|---|
| JP | B-3263167 B | 9/1994 |
| JP | 2004-293436 A | 10/2004 |
| JP | 2006-035760 A | 2/2006 |
| JP | 2011-148293 A | 8/2011 |
| JP | 2011-218700 A | 11/2011 |
| JP | 2013-077055 A | 4/2013 |

OTHER PUBLICATIONS

Office Action issued Oct. 27, 2015 in corresponding JP Application No. 2013-208977.

*Primary Examiner* — Walter L Lindsay, Jr.
*Assistant Examiner* — Ruth Labombard

(57) ABSTRACT

A pair of half hollow members are mated to each other at mating surfaces to form a resin filling space between the mating surfaces. The resin filling space is charged with melting resin, and the melting resin is solidified. Each of the mating surface has a groove. The groove has a bottom surface in which a hole opens. The groove and the hole form the resin filling space between the mating surfaces when the half hollow members are mated to each other. A wall surface of the groove and an inner circumferential periphery of the hole are equipped with a melting projection, which are configured to be melted with heat of the melting resin and to be solidified with the melting resin.

11 Claims, 10 Drawing Sheets

FIG. 1A
FIG. 1B
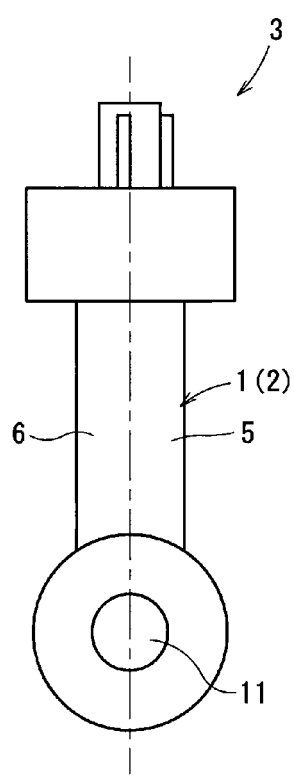
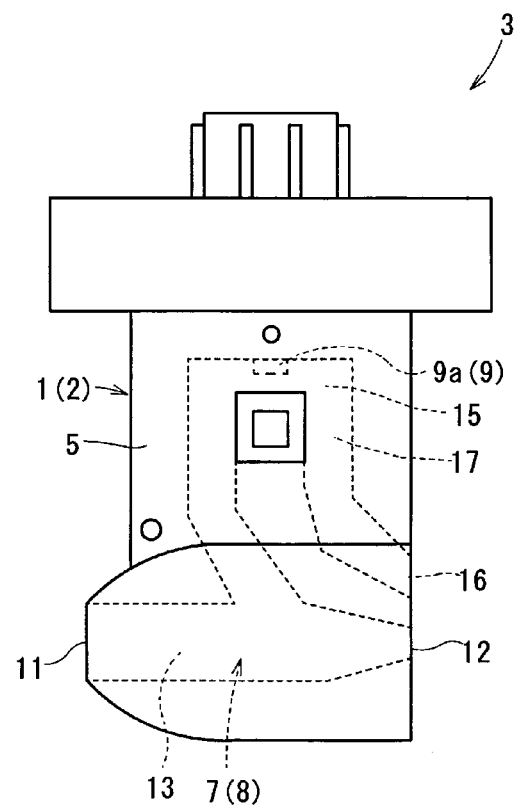

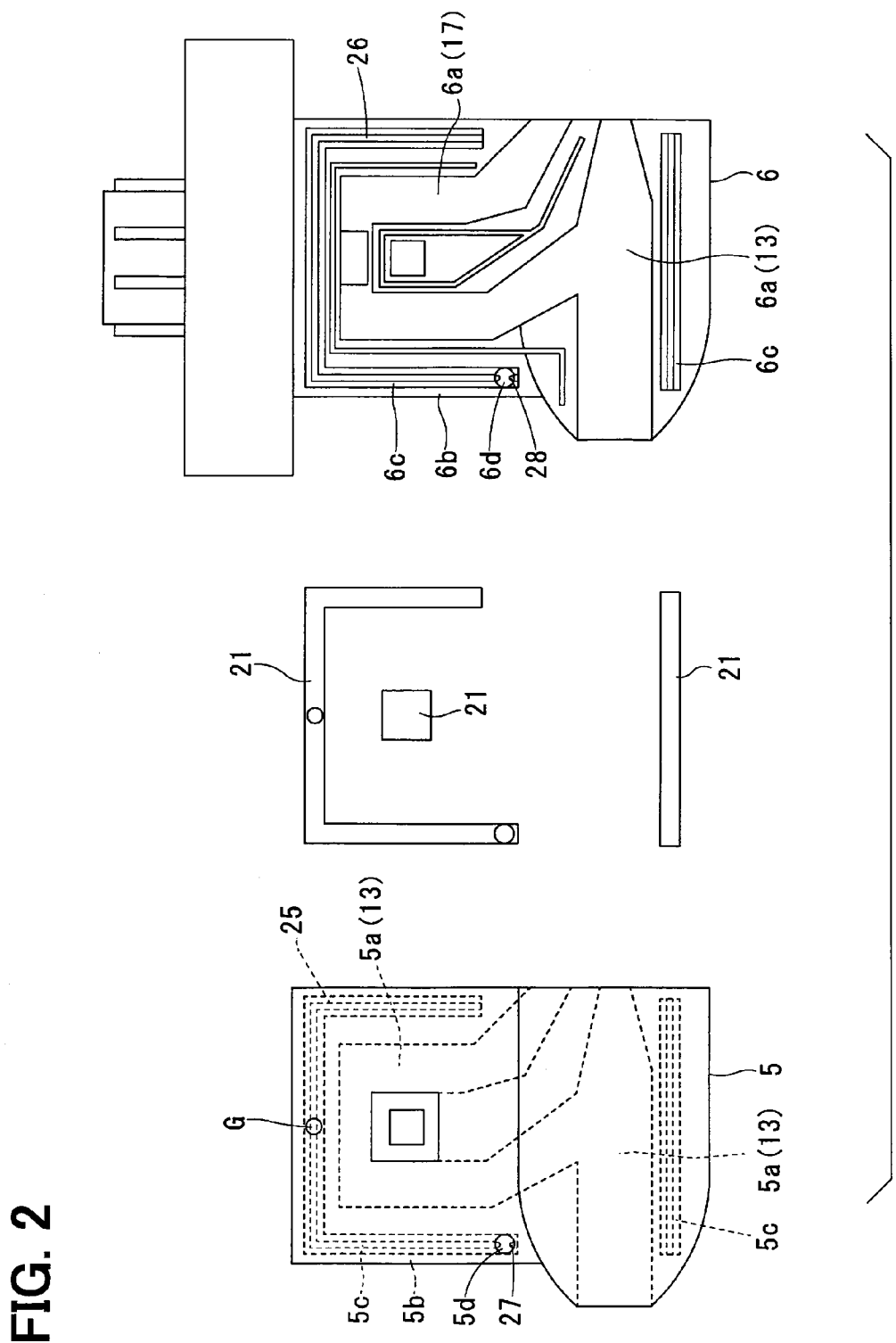

MANUFACTURING METHOD FOR RESIN HOLLOW MEMBER AND AIRFLOW MEASURING DEVICE HAVING THE RESIN HOLLOW MEMBER

CROSS REFERENCE TO RELATED APPLICATION

This application is based on reference Japanese Patent Application No. 2013-208977 filed on Oct. 4, 2013, the disclosure of which is incorporated herein by reference.

TECHNICAL FIELD

The present disclosure relates to a manufacturing method for a resin hollow member. The present disclosure further relates to the resin hollow member. The present disclosure further relates to an airflow measuring device having the resin hollow member manufactured by the manufacturing method.

BACKGROUND

Conventionally, a thermal-type airflow measuring device is employed to measure a flow rate of air by utilizing heat transfer from a heating element to air. The conventional thermal-type airflow measuring device is employed, for example, to measure a flow rate of intake air drawn into the internal combustion engine.

An airflow measuring device includes a case and a sensor. The case forms a passage of air. The sensor is located in the passage formed in the case. The case of the airflow measuring device is, for example, a resin hollow member having a hollow space. The case utilizes the hollow space as the passage of air.

For example, Patent Document 1 may disclose a method for manufacturing a resin hollow member. The method includes a primary forming step and a secondary forming step. The primary forming step includes to injection-mold resin to form a pair of half hollow members, such that each of the half hollow members has a half-hollow space. In the secondary forming step, the half hollow members are mated to form a resin filling space between the mated surfaces, and the resin filling space is charged with melting resin. Subsequently, the melting resin is solidified. That is, the half hollow members are joined together with secondary resin to manufacture the resin hollow member.

It is noted that, the manufacturing method of Patent Document 1 may have a concern that the joined portion between the half hollow members may have an insufficient strength. For example, in the resin hollow member formed by the method according to Patent Document 1, it may be difficult to enhance a joining strength between the half hollow members in a direction (mating direction) in which the half hollow members are opposed to each other.

Patent Document 2 may disclose to form a hole in a half hollow member to extended along a mated direction. Patent Document 2 may further disclose a secondary forming process to charge melting resin into the hole and to form a projected portion, which is greater than the hole in diameter, on the outside of the hole. It is noted that, the manufacturing method of Patent Document 2 includes to form the projected portion on the surface of the resin hollow member. Therefore, in a case where the resin hollow member is employed as, for example, a case of an airflow measuring device, the projected portion may cause turbulence in airflow around the surface of the airflow measuring device. Consequently, the turbulence may exert an adverse effect on measurement of airflow.

Patent Document 1

Publication of unexamined Japanese patent application No. 2011-148293

Patent Document 2

Japanese Patent Gazette No. 3263167

SUMMARY

It is an object of the present disclosure to produce a method for manufacturing a resin hollow member and to enable to enhance a joining strength between half hollow members. It is another object of the present disclosure to produce the resin hollow member.

According to an aspect of the present disclosure, a method is for manufacturing a resin hollow member. The resin hollow member has a hollow space internally. The method comprises mating a pair of half hollow members to each other at mating surfaces to form a resin filling space between the mating surfaces, the half hollow members being formed of resin. The method further comprises charging the resin filling space with melting resin and solidifying the melting resin. Each of the mating surface has a groove, which has a bottom surface in which a hole opens. The groove and the hole form the resin filling space between the mating surfaces when the half hollow members are mated to each other. A wall surface of the groove and an inner periphery of the hole are equipped with a melting projection, which are configured to be melted with heat of the melting resin and to be solidified with the melting resin.

According to another aspect of the present disclosure, a method is for manufacturing a resin hollow member having a hollow space internally. The method comprises mating a pair of half hollow members to each other at mating surfaces to cause a groove, which is formed in each of the mating surfaces, and a hole, which opens in a bottom surface of the groove, to form a resin filling space between the mating surfaces, the half hollow members being formed of resin. The method further comprises charging the resin filling space with melting resin to melt a melting projection, which is formed on a wall surface of the groove and an inner periphery of the hole, with heat of the melting resin. The method further comprises solidifying the melting projection with the melting resin.

According to another aspect of the present disclosure, a resin hollow member has a hollow space internally. The resin hollow member comprises a first half hollow member. The resin hollow member further comprises a second half hollow member. The first half hollow member and the second half hollow member have mating surfaces, respectively. Each of the mating surfaces defines a groove, which has a bottom surface in which a hole opens. The groove and the hole are configured to form a resin filling space between the mating surfaces when the first half hollow member and the second half hollow member are mated to each other at the mating surfaces. A wall surface of the groove and an inner periphery of the hole are equipped with a melting projection, which are configured to be melted with heat of the melting resin and to be solidified with the melting resin.

BRIEF DESCRIPTION OF THE DRAWINGS

The above and other objects, features and advantages of the present invention will become more apparent from the following detailed description made with reference to the accompanying drawings. In the drawings:

FIG. 1A is a rear view showing an airflow measuring device, and FIG. 1B is a side view showing the airflow measuring device;

FIG. 2 is an exploded view showing a resin hollow member of the airflow measuring device according to an embodiment;

DETAILED DESCRIPTION

Figure 3:
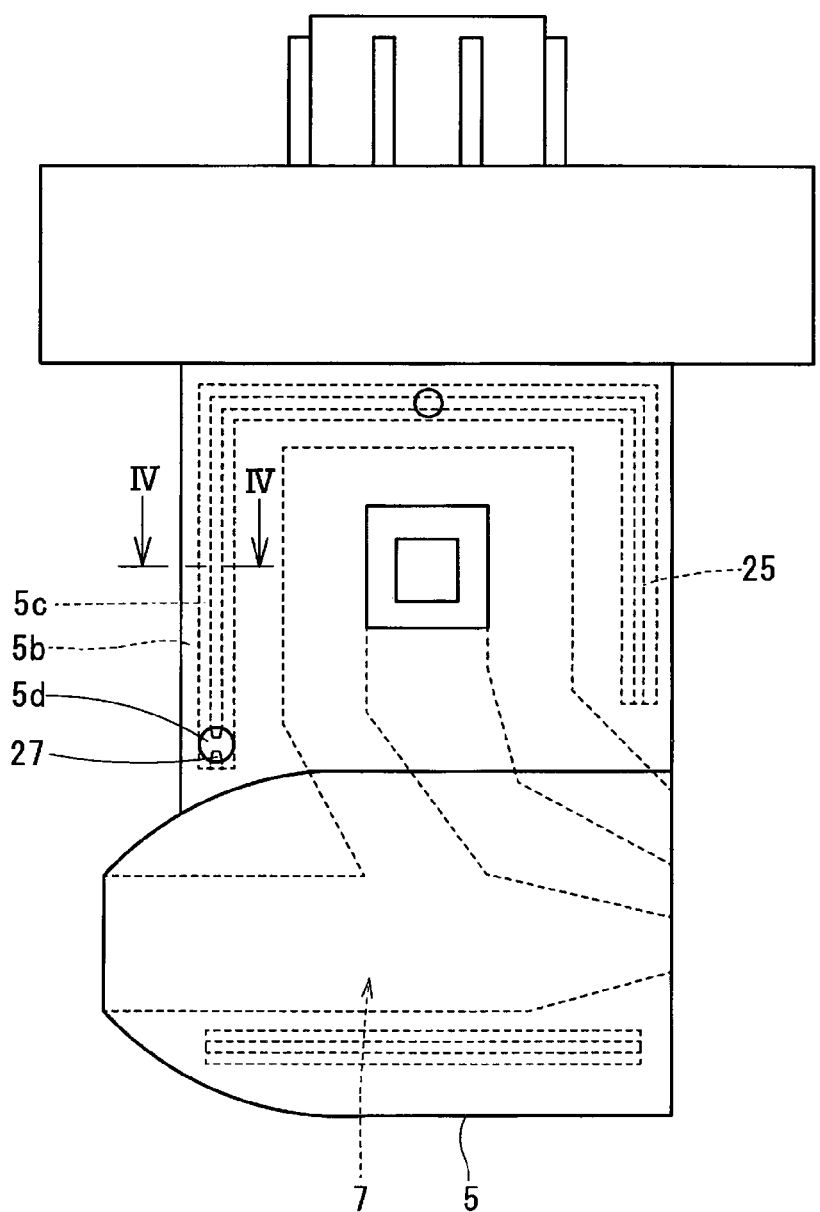
FIG. 3 is a side view showing a state where half hollow members are mated together, according to the embodiment.

As follows, an embodiment according to the present disclosure will be described in detail with reference to drawings.

Embodiment

Configuration of Airflow Measuring Device

Configurations of a resin hollow member 1 and an airflow measuring device 3 according to an embodiment will be described with reference to FIGS. 1 to 7. The airflow measuring device 3 includes the resin hollow member 1 as a case 2. The resin hollow member 1 is formed of resin. The airflow measuring device 3 employs a thermal-type measurement configuration to measure a flow rate of air by utilizing heat transfer from a heating element (not shown) to air. The airflow measuring device 3 is located at, for example, an air intake passage (not shown) of an internal combustion engine to measure a flow rate of intake air drawn into the internal combustion engine. The resin hollow member 1 includes a pair of half hollow members 5 and 6, which are formed of resin. The pair of half hollow members 5 and 6 are joined together to form a hollow space 7 therebetween. The resin hollow member 1 functions as the case 2 of the airflow measuring device 3. The hollow space 7 forms a passage 8 for intake air. The half hollow member 5 may correspond to a first half hollow member. The half hollow member 6 may correspond to a second half hollow member.

The airflow measuring device 3 further includes a sensor 9 for detecting a flow of air drawn into the passage 8. The sensor 9 includes a sensor chip 9a and a driver control circuit (not shown). The sensor chip 9a includes a semiconductor circuit board equipped with an element such as a heating element. The driver control circuit drives the element of the sensor chip 9a. The sensor chip 9a and the control circuit are integrated into a single component to form a sub-assembly. In the airflow measuring device 3, the sub-assembly is inserted in the case 2, such that the sensor chip 9a is exposed to the passage 8.

The passage 8 formed in the case 2 includes an inlet 11, an outlet 12, a straight passage 13, a bent portion 15, and a round passage 17. The inlet 11 opens toward the upstream in the air intake passage. The outlet 12 opens toward the downstream in the air intake passage. The straight passage 13 is formed linearly between the inlet 11 and the outlet 12. The round passage 17 branches from an intermediate portion of the straight passage 13 to extend through the bent portion 15 toward an outlet 16. The outlet 16 opens toward the downstream in the air intake passage.

The bent portion 15 of the round passage 17 is branched from the straight passage 13 to extend radially outward relative to the air intake passage. Subsequently, the bent portion 15 extends toward the downstream of the air intake passage. Subsequently, the bent portion 15 extends radially inward relative to the air intake passage. The sensor chip 9a is located in the round passage 17.

With the present configuration, the airflow measuring device 3 draws a part of intake air, which flows through the air intake passage, into the passage 8. In addition, the sensor chip 9a generates an electric signal representing a flow rate of intake air and sends the electric signal. In the present configuration, the sensor chip 9a is not located directly in the air intake passage. The sensor chip 9a is located in the passage 8 of the case 2 of the airflow measuring device 3. The present configuration of the airflow measuring device 3 enables to avoid direct influence of turbulence of flow in the air intake passage exerted to the sensor chip 9a. Thus, the present configuration enables the sensor chip 9a to send an electric signal representing the measurement result with less variation.

Manufacturing Method of Resin Hollow Member

A manufacturing method for the resin hollow member 1 according to the embodiment will be described with reference to FIGS. 1A to 7. The manufacturing method of the resin hollow member 1 employs a die slide injection molding (DSI) method including the following processes.

As described below, the manufacturing method of the resin hollow member 1 includes a primary forming step and a secondary forming step. In the primary forming step, the half hollow members 5 and 6 are formed. In the secondary forming step, the half hollow members 5 and 6 are joined together with a secondary resin. Specifically, as shown in FIGS. 3 to 6, an opening periphery of the half hollow member 5 and an opening periphery of the half hollow member 6 are mated (butted) to each other. Thus, the mated peripheries form a resin filling space 20, into which melting resin is to be charged. Subsequently, the resin filling space 20 is charged with melting resin. Subsequently, the melting resin is solidified to form a secondary resin portion 21. Thus, the half hollow members 5 and 6 are joined together with the secondary resin portion 21.

In the primary forming step, as shown in FIG. 2, the half hollow members 5 and 6 are formed to have passage grooves 5a and 6a, mating surfaces 5b and 6b, grooves 5c and 6c, and holes 5d and 6d, respectively. The grooves 5c and 6c and the holes 5d and 6d form the resin filling space 20. The passage grooves 5a and 6a define a space, which forms the passage 8 when the resin hollow member 1 is manufactured. The mating surfaces 5b and 6b are formed on the opening periphery of the passage grooves 5a and 6a. The mating surface 5b makes contact with the half hollow member 6 as a counterpart, and the mating surface 6b make contact with the half hollow member 5 as a counterpart, when the half hollow members 5 and 6 are mated to each other. In the present embodiment, as shown in FIG. 4, the mating surfaces 5b and 6b are flat surfaces, which are perpendicular to a mating direction in which the half hollow members 5 and 6 are mated to each other.

Figure 4:
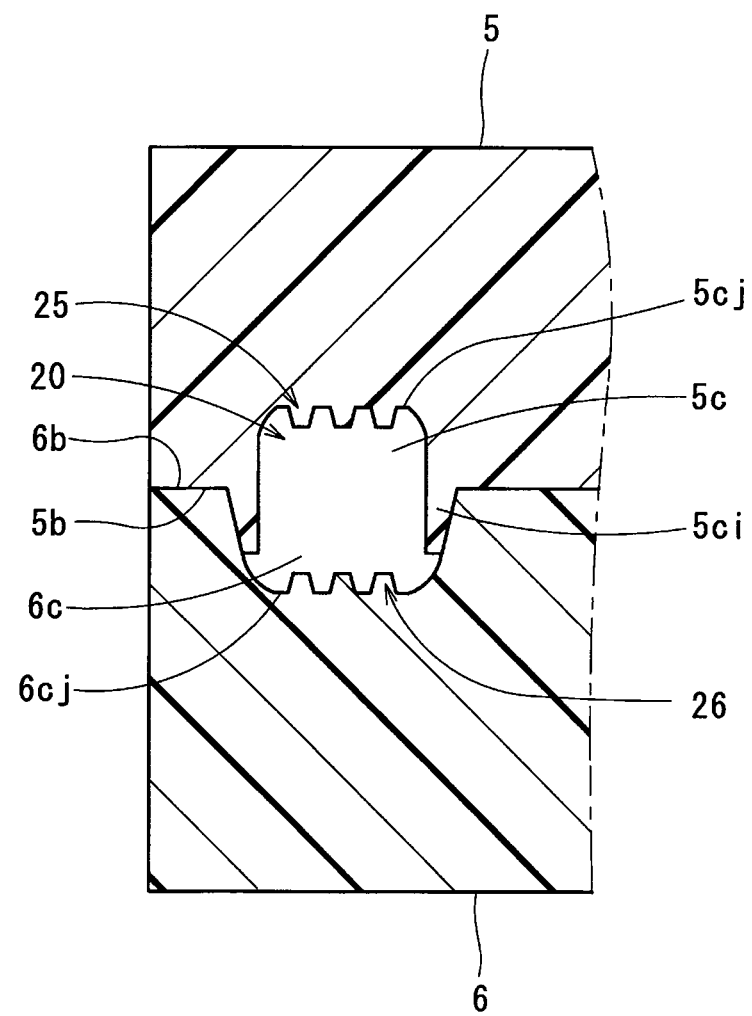
FIG. 4 is a sectional view taken along the line IV-IV in FIG. 3, according to the embodiment.
Figure 6:
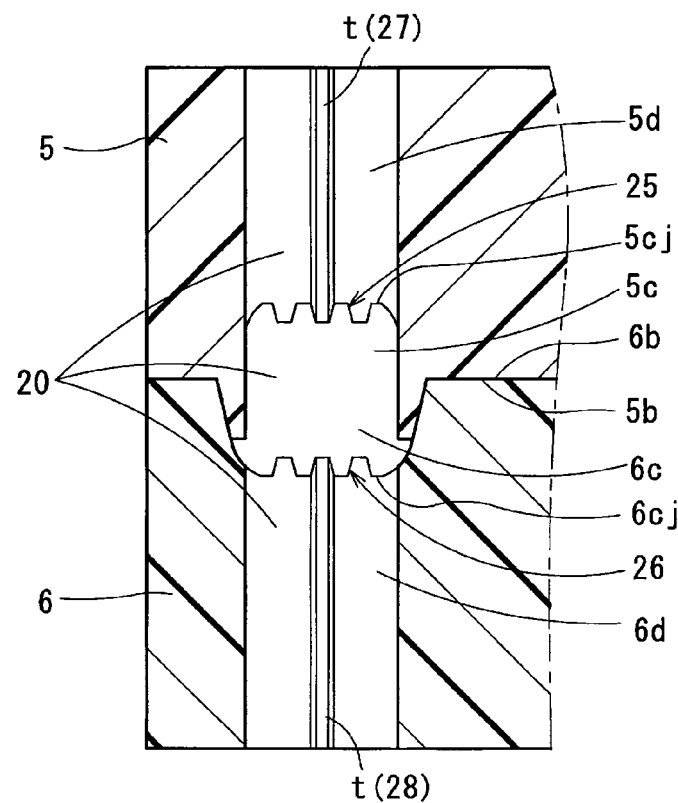
FIG. 6 is a sectional view taken along the line VI-VI in FIG. 5, according to the embodiment.

Referring to FIGS. 2 and 4, the grooves 5c and 6c are formed on the mating surfaces 5b and 6b, respectively. Each of the grooves 5c and 6c extends along, for example, the opening periphery of the passage grooves 5a and 6a in a line form. Specifically, as shown in FIG. 2, the grooves 5c and 6c may be formed along the straight passage 13 and the round passage 17. In the present embodiment, the opening periphery of the groove 5c has a protrusion wall 5ci projected from the opening periphery. The protrusion wall 5ci is fitted to the groove 6c. As shown in FIGS. 2 and 6, holes 5d and 6d open on groove bottom surfaces of the grooves 5c and 6c, respectively. The holes 5d and 6d extend perpendicularly to the mating surfaces 5b and 6b. In the present embodiment, the holes 5d and 6d extend through the half hollow members 5 and 6 to the outside of the half hollow members 5 and 6, respectively.

The grooves 5c and 6c and the holes 5d and 6d form a single space when the mating surfaces 5b and 6b are in contact with each other. The space formed with the grooves 5c and 6c and the holes 5d and 6d is the resin filling space 20. In the present embodiment, the holes 5d and 6d are formed as single holes in the mating surfaces 5b and 6b, respectively. It is noted that, two or more holes may be formed in at least one of the mating surfaces 5b and 6b, as the hole 5d and 6d.

It is further noted that, a gate G is formed in at least one of the half hollow members 5 and 6 to charge melting resin into the resin filling space 20. In the present embodiment, the gate G is formed in the half hollow member 5. The gate G is formed separately from the holes 5d and 6d.

As follows, the resin filling space 20 will be described further in detail. A wall surface, which forms the resin filling space 20, has a melting projection. When the resin filling space 20 is charged with melting resin, the melting projection is melted with heat of the melting resin and is solidified with the melting resin.

More specifically, as shown in FIGS. 2 and 4, melting projections 25 and 26 are formed on groove bottom surfaces 5cj and 6cj of the grooves 5c and 6c, respectively. As shown in FIG. 2, the melting projection 25 includes multiple projections each being in a line form to extend along a direction in which the groove 5c extends. The melting projection 26 includes multiple projections each being in a line form to extend along a direction in which the groove 6c extends.

It is noted that, the melting projections 25 and 26 may be formed on a groove lateral surface.

Figure 5:
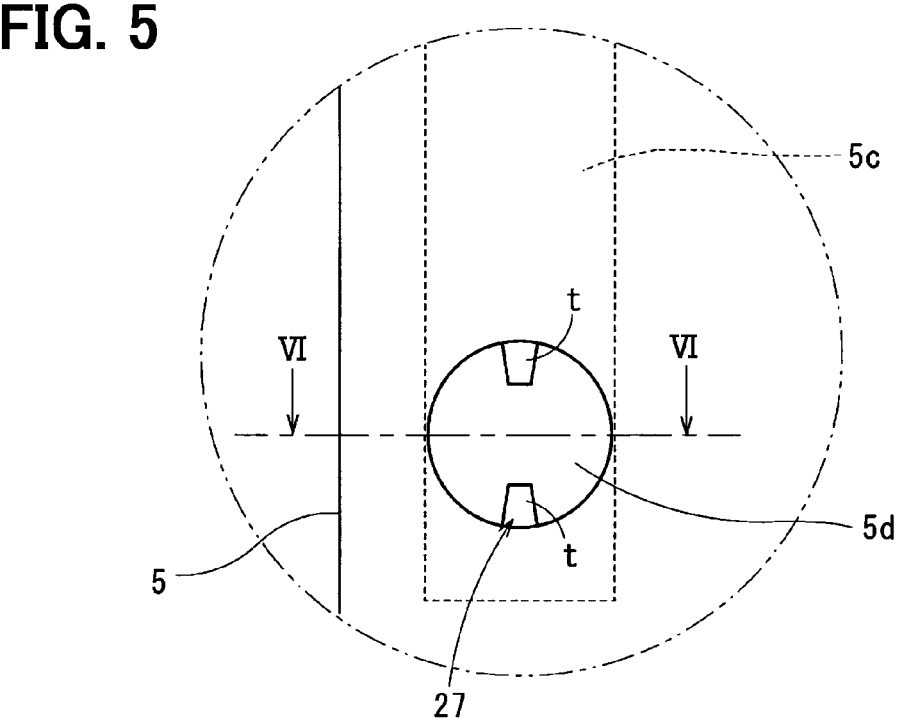
FIG. 5 is an enlarged view showing a portion of FIG. 3 according to the embodiment.

As shown in FIGS. 5 and 6, melting projections 27, each being in a linear form, are formed on an inner circumferential periphery of the hole 5d to extend in an axial direction of the hole 5d. Melting projections 28, each being in a linear form, are formed on an inner circumferential periphery of the hole 6d to extend in an axial direction of the hole 6d. In the present embodiment, the melting projections 27 and 28 include two projections t each projected into the holes 5d and 6d to be opposed to each other. The two projections t are opposed to each other in a direction in which, for example, the grooves 5c and 6c extend.

In FIG. 6, the projections t extend throughout the holes 5d and 6d in total length. In FIG. 5, the projection t has a trapezoid shape sectional shape taken perpendicular to the holes 5d and 6d.

Figure 7:
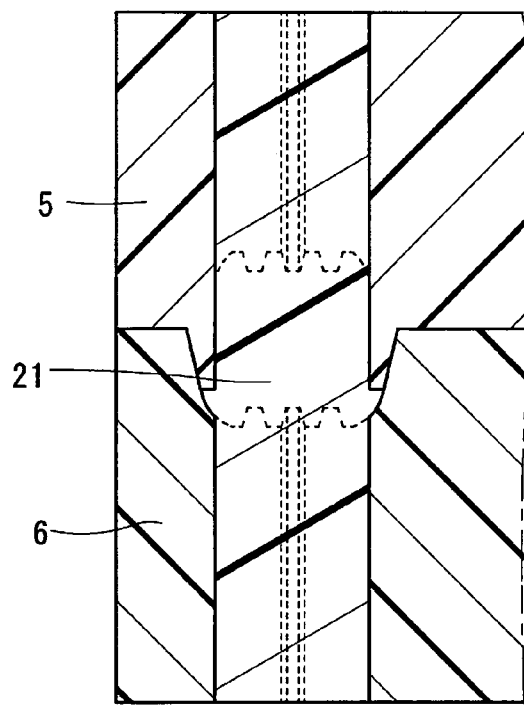
FIG. 7 is a sectional view showing the resin hollow members subsequent to a secondary forming step, according to the embodiment.

As shown in FIG. 7, when the resin filling space 20 is charged with melting resin, the melting projections 25 to 28 are melted with heat of the melting resin. Subsequently, the melting projections 25 to 28 are solidified and welded with the melting resin. In the present embodiment, the holes 5d and 6d extend through the half hollow members 5 and 6 to the outside of the half hollow members 5 and 6, respectively. It is noted that, the melting resin is charged not to spill over the holes 5d and 6d. That is, the melting resin is charged not to form a projected portion of the secondary resin portion 21 on the surface of the resin hollow member 1.

Operation Effect

According to the embodiment, the melting projections 25 to 28 formed on both the grooves 5c and 6c and the holes 5d and 6d enable to enhance a welding strength among the secondary resin portion 21 and the half hollow members 5 and 6. Therefore, the joining strength between the half hollow members 5 and 6 can be enhanced. In addition, a projected portion is not formed on the surface of the resin hollow member 1, dissimilarly to a conventional form. Therefore, in a case where the present embodiment is employed in the case 2 for the airflow measuring device 3, turbulence of flow may be avoided.

Modification

Figure 8:
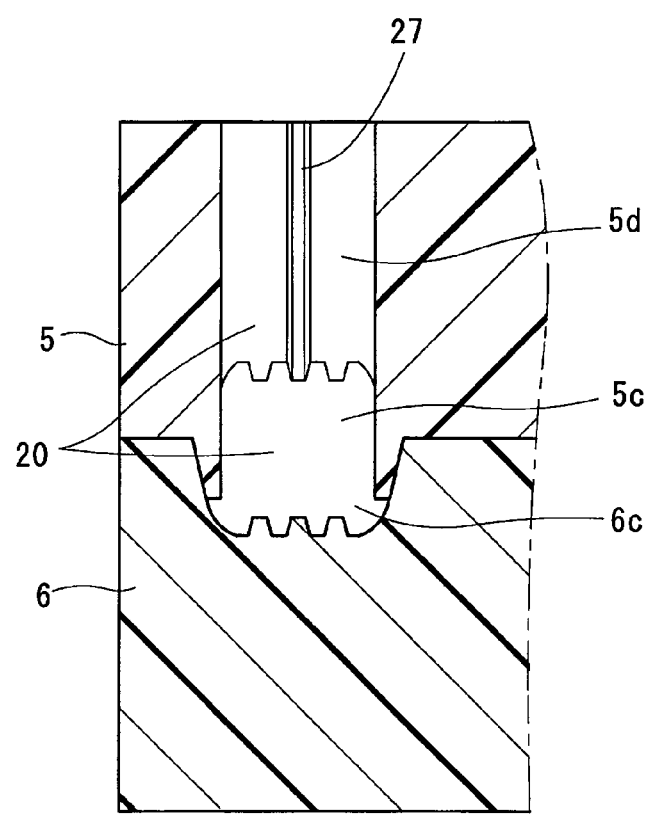
FIGS. 8 to 12 are sectional views showing resin filling spaces according to modifications, respectively.
Figure 9:
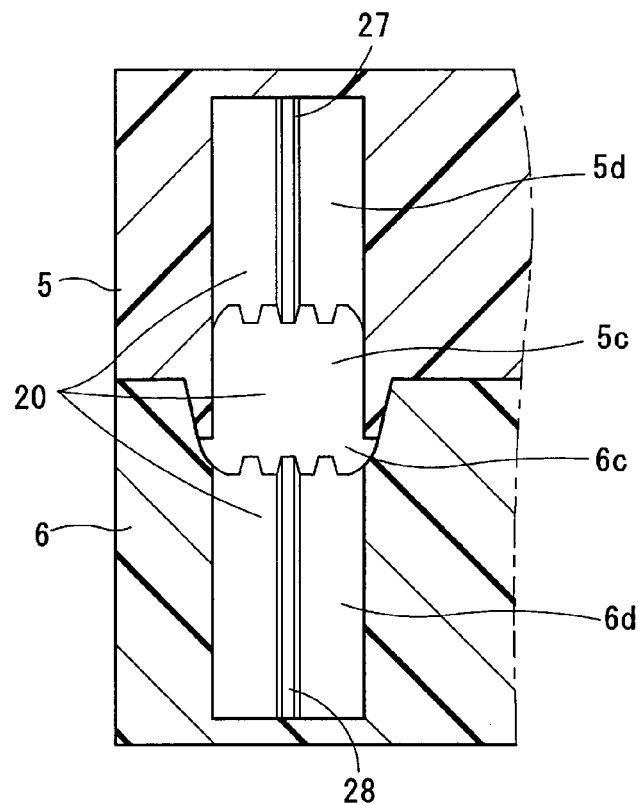
Figure 10:
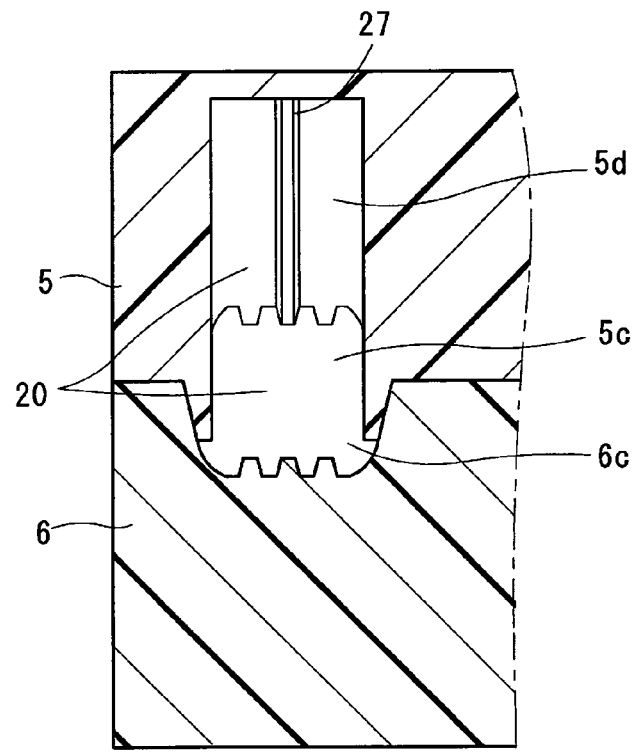

The configurations of the resin hollow member 1 and the airflow measuring device 3 are not limited to those in the above-described embodiment, and may employ various modifications. As shown in FIG. 8, for example, the hole 6d may not be formed, and only the hole 5d may be formed. In addition, as shown in FIG. 9, the holes 5d and 6d may not extend through the half hollow members 5 and 6 to the outside of the half hollow members 5 and 6. The holes 5d and 6d may be in bottomed shapes. In addition, as shown in FIG. 10, only the hole 5d may be formed, and the hole 5d may be in a bottomed shape.

Figure 11:
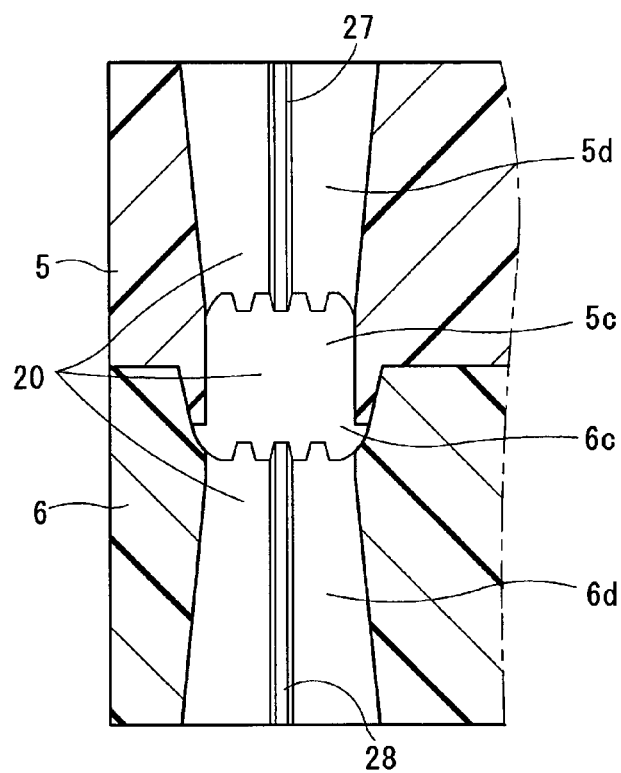
Figure 12:
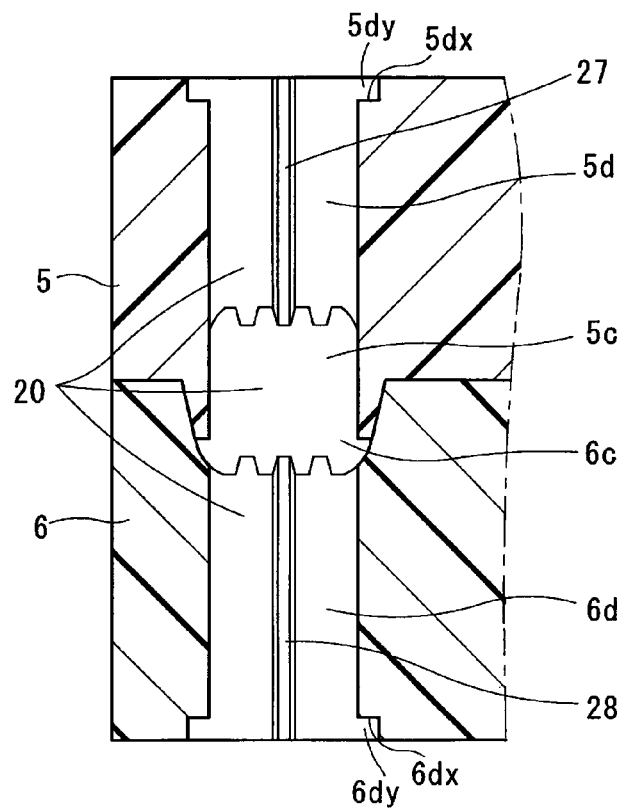

In addition, as shown in FIG. 11, the holes 5d and 6d may extend to increase in diameter toward the outside. In addition, as shown in FIG. 12, the holes 5d and 6d may have large diameter portions 5dy and 6dy through step portions 5dx and 6dx at outer ends, respectively. The large diameter portions 5dy and 6dy may have a greater diameter than the diameter of the holes 5d and 6d, respectively.

Figure 13:
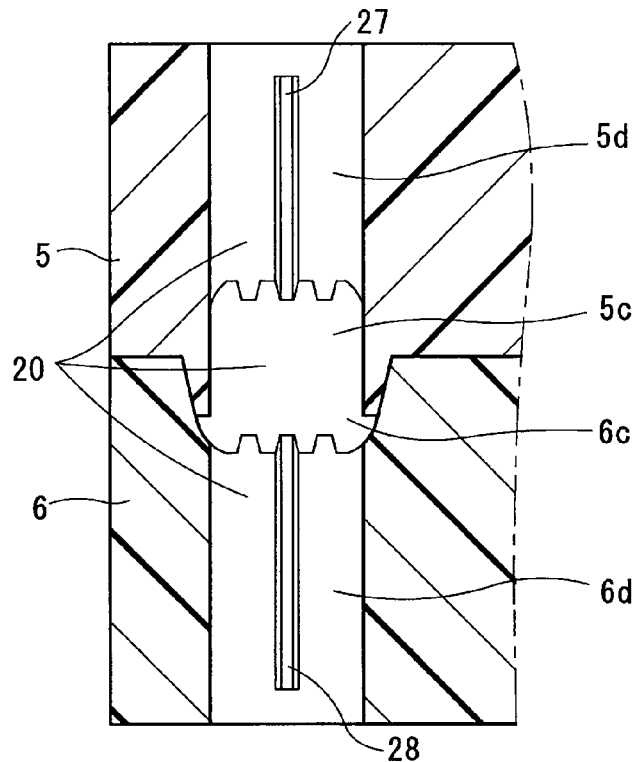
FIGS. 13 to 14 are sectional views showing melting projections according to modifications, respectively.
Figure 14:
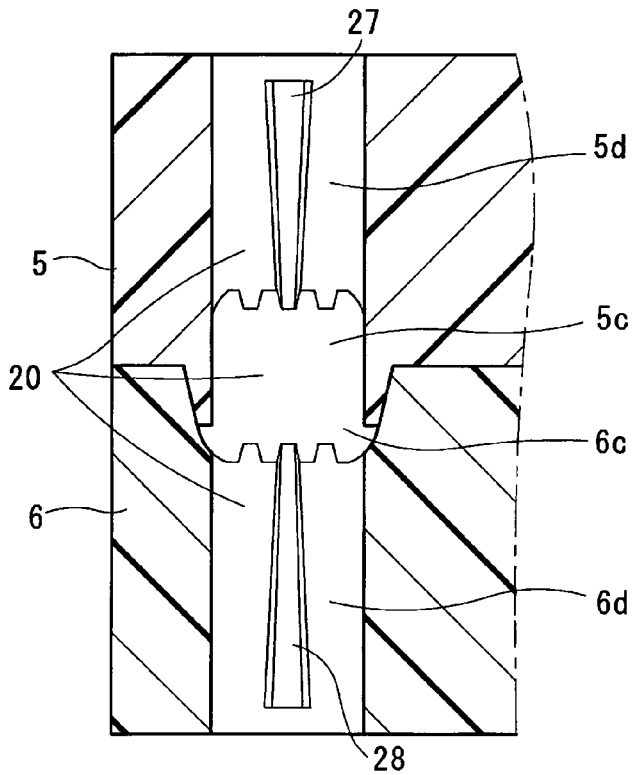

In addition, the melting projections 27 and 28 may not be formed throughout the holes 5d and 6d in total length. For example, as shown in FIG. 13, the outer ends of the melting projections 27 and 28 may be located inside relative to the outer ends of the holes 5d and 6d, respectively. In addition, as shown in FIG. 14, the melting projections 27 and 28 may increase in width toward the outer ends of the holes 5d and 6d, respectively.

Furthermore, for example, as shown in FIGS. 15A to 15E, the arrangement and the shapes of the melting projections 27 and 28 may take various variations in the holes 5d and 6d. In FIGS. 15A to 15E, only the hole 5d and the melting projection 27 are illustrated. It is noted that, the hole 6d and the melting projection 28 may take forms similar to those of the hole 5d and the melting projection 27.

Figure 15A:
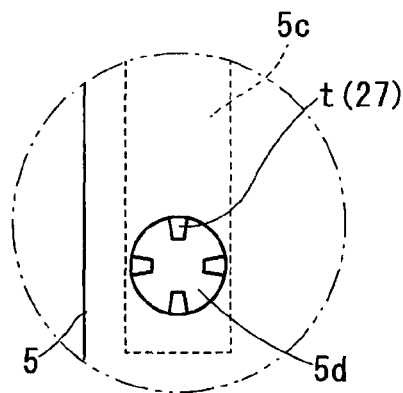
FIGS. 15A to 15E are explanatory views showing melting projections according to modifications, respectively.
Figure 15B:
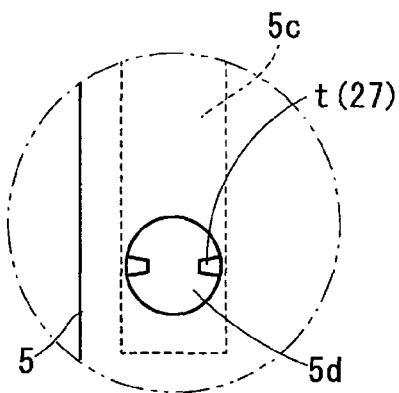

For example, as shown in FIG. 15A, the melting projection 27 may include four projections t, which are arranged in the circumferential direction of the hole 5d at intervals of 90 degrees. In addition, as shown in FIG. 15B, the melting projection 27 may include two projections t, which are opposed to each other in a direction perpendicular to the direction in which the groove 5c extends.

Figure 15C:
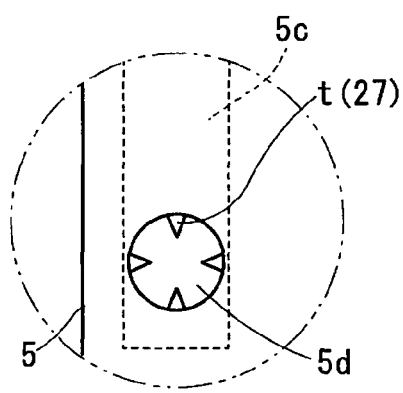
Figure 15D:
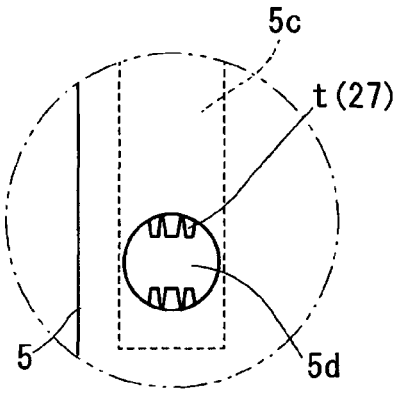
Figure 15E:
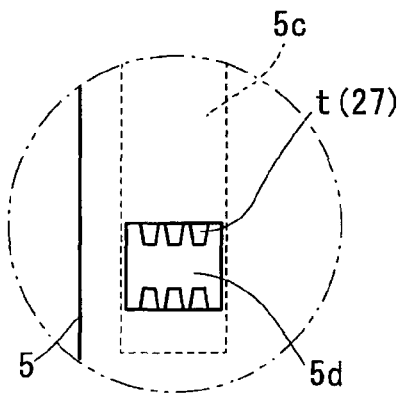

The cross-sectional shape of the projection t is not limited to a trapezoidal shape. As shown in FIG. 15C, the projection t may have a triangular cross-sectional shape. In addition, as shown in FIG. 15D, the melting projection 27 may include multiple projections t, which are opposed to each other in the direction in which the groove 5c extends. The sectional shape of the hole 5d is not limited to a circular shape. For example, as shown in FIG. 15E, the hole 5d may have a rectangular cross section.

The method for manufacturing the resin hollow member according to the present disclosure includes to mate the pair of half hollow members to each other to form the resin filling space between the mating surfaces. The method further includes to charge the resin filling space with the melting resin. The method further includes to solidify the melting resin.

The half hollow member has the groove, which is formed on the mating surface, and the hole, which opens in the bottom surface of the groove. The groove and the hole form the resin filling space between mating surfaces when the half hollow members are mated to each other.

The melting projection is formed on the wall surface of the groove and the inner circumferential periphery of the hole. The melting projection is melted with heat of the melting resin. The melting projection is solidified with the melting resin.

According to the present method and configuration, the melting projection on both the groove and the hole may enable to enhance welding strength, thereby to enhance joining strength between the half hollow members.

In addition, a projected portion is not formed on the surface of the resin hollow member, dissimilarly to a conventional form. Therefore, in a case where the present embodiment is employed in the case for the airflow measuring device, turbulence of flow may be avoided.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A method for manufacturing a resin hollow member having a hollow space internally, the method comprising:
   mating a pair of half hollow members to each other at mating surfaces to form a resin filling space between the mating surfaces, the half hollow members being formed of resin; and
   charging the resin filling space with melting resin and solidifying the melting resin, wherein
   each of the mating surface has a groove, which has a bottom surface in which a hole opens,
   the groove and the hole form the resin filling space between the mating surfaces when the half hollow members are mated to each other, and
   each of a wall surface of the groove and an inner periphery of the hole includes a melting projection, which is configured to be melted with heat of the melting resin and to be solidified with the melting resin, wherein
   each of the mating surfaces has a flat surface,
   the hole of each of the mating surfaces linearly extends along a specified direction perpendicular to the each of the mating surfaces,
   the melting projection of the inner periphery of the hole linearly extends along the specified direction, and
   the melting projection of the inner periphery of the hole has a tapered cross-sectional shape taken along a direction perpendicular to the specified direction with a width gradually narrowing toward a distal end of the melting projection.

2. An airflow measuring device comprising:
   the resin hollow member manufactured by the method according to claim 1; and
   a sensor located in the hollow space and configured to measure a flow rate of air drawn into the hollow space.

3. A method for manufacturing a resin hollow member having a hollow space internally, the method comprising:
   mating a pair of half hollow members to each other at mating surfaces to cause a groove, which is formed in each of the mating surfaces, and a hole, which opens in a bottom surface of the groove, to form a resin filling space between the mating surfaces, the half hollow members being formed of resin;
   charging the resin filling space with melting resin to melt a melting projection formed on a wall surface of the groove and a melting projection formed on an inner periphery of the hole, with heat of the melting resin; and
   solidifying the melting projection of the groove and the melting projection of the hole with the melting resin, wherein
   each of the mating surfaces has a flat surface,
   the hole of each of the mating surfaces linearly extends along a specified direction perpendicular to the each of the mating surfaces,
   the melting projection of the inner periphery of the hole linearly extends along the specified direction, and
   the melting projection of the inner periphery of the hole has a tapered cross-sectional shape taken along a direction perpendicular to the specified direction with a width gradually narrowing toward a distal end of the melting projection.

4. An airflow measuring device comprising:
   the resin hollow member manufactured by the method according to claim 3; and
   a sensor located in the hollow space and configured to measure a flow rate of air drawn into the hollow space.

5. A resin hollow member having a hollow space internally, the resin hollow member comprising:
   a first half hollow member; and
   a second half hollow member, wherein
   the first half hollow member and the second half hollow member have mating surfaces, respectively,
   each of the mating surfaces defines a groove, which has a bottom surface in which a hole opens,
   the groove and the hole are configured to form a resin filling space between the mating surfaces when the first half hollow member and the second half hollow member are mated to each other at the mating surfaces, and
   each of a wall surface of the groove and an inner periphery of the hole includes a melting projection, which is configured to be melted with heat of the melting resin and to be solidified with the melting resin, wherein each of the mating surfaces has a flat surface, the hole of each of the mating surfaces linearly extends along a specified direction perpendicular to the each of the mating surfaces, the melting projection of the inner periphery of the hole linearly extends along the specified direction, and the melting projection of the inner periphery of the hole has a tapered cross-sectional shape taken along a direction perpendicular to the specified direction with a width gradually narrowing toward a distal end of the melting projection.

6. An airflow measuring device comprising:

the resin hollow member according to claim 5; and a sensor located in the hollow space and configured to measure a flow rate of air drawn into the hollow space.

7. The resin hollow member according to claim 5, wherein the hole has a diameter gradually increasing away from the bottom surface of the groove.

8. The resin hollow member according to claim 5, wherein the hole has a large diameter portion at an outer end of the hole.

9. The resin hollow member according to claim 5, wherein the hole has a rectangular cross-sectional shape.

10. The resin hollow member according to claim 5, wherein the melting projection of the inner periphery of the hole has a width gradually increasing toward an outer end of the hole.

11. The resin hollow member according to claim 5, wherein the melting projection of the inner periphery of the hole has a triangular cross-sectional shape taken along the direction perpendicular to the specified direction.

* * * * *